United States Patent [19]
Koenig et al.

[11] 3,841,415
[45] Oct. 15, 1974

[54] DRAFT VEHICLE AND HITCH STRUCTURE FOR CONNECTING THE VEHICLE TO AN IMPLEMENT

[75] Inventors: Walter Koenig, Bergisch Gladbach; Heribert Adams, Rosrath, both of Germany

[73] Assignee: Klockner-Humboldt-Deutz Aktiengesellschaft, Kohn-Deutz, Germany

[22] Filed: May 10, 1973

[21] Appl. No.: 359,193

[30] Foreign Application Priority Data
May 13, 1972 Germany............................ 2223416

[52] U.S. Cl................ 172/439, 172/678, 280/460 A
[51] Int. Cl................................................ A01b 0/43
[58] Field of Search .......... 172/439, 444, 445, 449, 172/678, 705; 182/460 A, 461 A

[56] References Cited
UNITED STATES PATENTS
2,822,738   2/1958   Smith.................................. 172/444
2,971,591   2/1961   Silver et al......................... 172/444

*Primary Examiner*—Stephen C. Pellegrino
*Attorney, Agent, or Firm*—Walter Becker

[57] ABSTRACT

A draft vehicle having an axle and a frame resiliently supported on the axle is provided with a hitch device for connecting an implement to the vehicle. The hitch device includes an upper link pivoted at one end to the vehicle frame and at the other end to the implement and lower links pivoted at one end to the implement and having the other ends near the vehicle axle. Lift devices engage the lower links between the ends and extend therefrom upwardly to a point of pivotal connection with the vehicle frame. The other ends of the lower links are connected to the vehicle axle and frame by linkage which transmits power from the axle to the lower links while at the same time causing the ends of the lower links near the vehicle to move up and down as the vehicle frame moves up and down on the axle.

6 Claims, 1 Drawing Figure

PATENTED OCT 15 1974 3,841,415
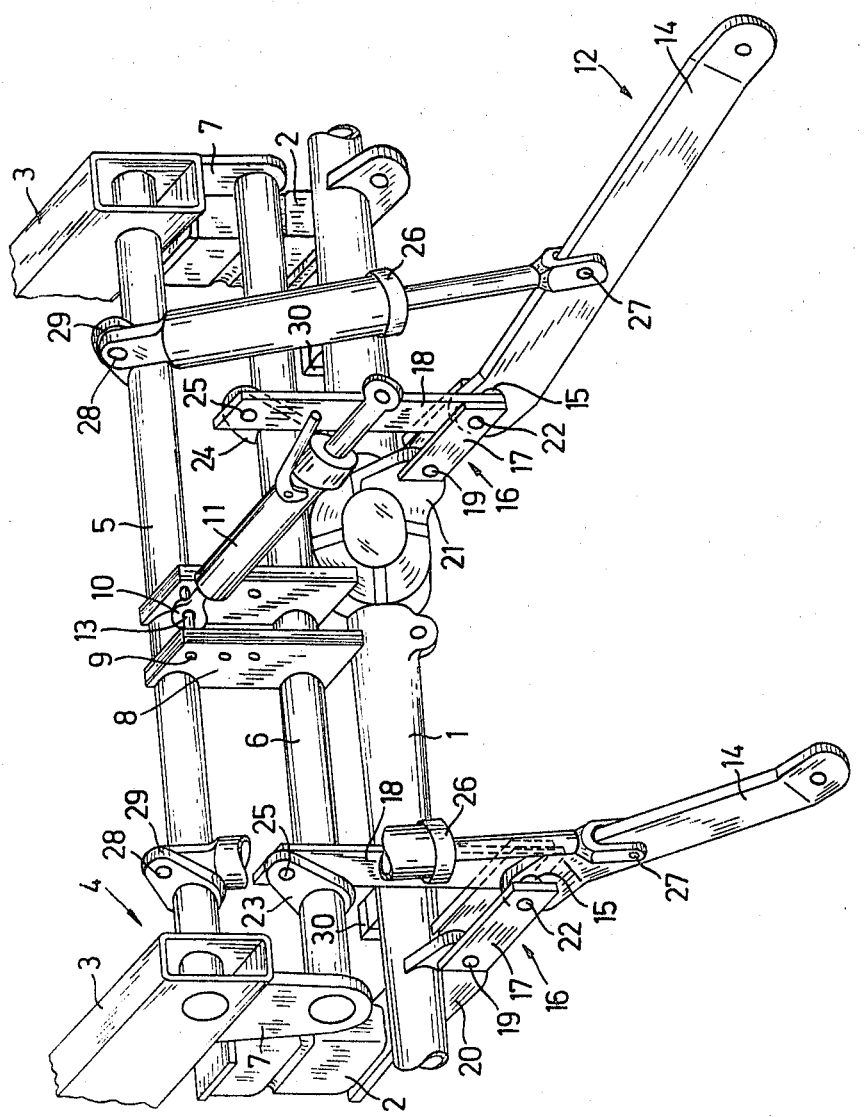

DRAFT VEHICLE AND HITCH STRUCTURE FOR CONNECTING THE VEHICLE TO AN IMPLEMENT

The present invention relates to a vehicle, especially motor vehicle for agricultural and/or constructional work, which is provided with a front and/or rear axle forming the steering and/or driving axle, said axle being cushioned relative to the vehicle frame and comprising a rigid axle body. More specifically, the invention concerns a vehicle of the just mentioned type which is provided with an implement connecting device arranged at the front and/or rear of the vehicle and adapted to be lifted and lowered. The implement connecting device is preferably in the form of a four-bar-chain.

Vehicles of the above mentioned type have become known in which the implement connecting device arranged on the rear of the vehicle forms a three-point rod system or link system of which the two lower links are directly connected to the driving axle while the upper link is directly connected to a structural element of the vehicle frame cushioned relative to the driving axle. By means of this type of linkage system of the lower links of the implement connecting device, the important drawback is encountered with the cushioning of the vehicle frame relative to the driving axle in that the four-bar-chain does not change in the same direction and that consequently the ideal linkage point with the vehicle moves out of a preset pole path (Polbahn). As a result thereof, with a soil working implement connected to an implement connecting device, the working depth of said implement and its pull resistance are changed or varied in a disadvantageous manner so that the frame is through the upper link caused to deflect or sag with the harmful effects inherent thereto. Moreover, in view of the described manner of linking the implement connecting device, the soil working implement will in view of the given kinematic transmission ratio deflect to a considerably greater extent than the frame. In addition to the above mentioned change in the working depth of the soil working implement and the change in its working resistance, a continuous variation in the pulling force results whereby the driving efficiency, especially the driving wheel efficiency, is disadvantageously affected.

Based on these findings, it is an object of the present invention to improve a vehicle of the above mentioned general type by simple constructional means while avoiding the above outlined drawbacks so that the influence of the deflection of the vehicle frame relative to the axle or axles will not affect or only slightly affect the position of the ideal linkage point of the implement connecting device and thereby will not affect or only slightly affect the working depths of a working implement connected to the implement connecting device.

These and other objects and advantages of the invention will appear more clearly from the following specification in connection with the accompanying drawing which illustrates an isometric view of the rear portion of a vehicle according to the invention.

The vehicle according to the present invention, which is provided with a front and/or rear axle that is cushioned relative to the motor frame and provided with a rigid axle body and is formed as a steering and/or driving axle and has an implement connecting device which is linked to the front and/or rear of the vehicle and is adapted to be lifted and lowered while being designed as a four-bar-chain, is characterized primarily in that the connecting element on the vehicle side of the upper link or the upper links is directly or indirectly coupled to the link or links by means of a device which is adapted to transmit the vertical spring stroke of said link or links proportionally or nearly proportionally onto the connecting link on the vehicle side of the lower link or lower links. By this type of linking the implement connecting device to a vehicle with a frame cushioned relative to the vehicle axle or axles, it is realized in an advantageous manner that with a deflection of the frame, the four-bar-chain can change only in the same direction.

A particularly advantageous solution with regard to costs is obtained in this connection when designing the device which transmits the spring stroke of the connecting element on the vehicle side of the upper link or links onto the connecting element on the vehicle side of the lower link or links as a link or joint which preferably forms a three-bar-chain and is coupled to the axle as well as a structural element of the frame.

A particularly precise elimination of the influence of the deflection or springing of the frame onto each of the two lower links of the implement connecting device is obtained by coupling each of the two lower links through a link forming a three-bar-chain, to the axle as well as a structural member of the frame. For precisely maintaining the kinematics of the four-bar-chain, it is advantageous that the lower links of the implement connecting device are at the coupling point of the two coupling elements of the three-bar-chain connected to the latter.

The influence of the spring or deflection of the frame upon the kinematics of the four-bar-chain of the implement connecting device can be eliminated in a particularly favorable manner from a cost standpoint by designing the link element of the three-bar-chain, which link element is connected to a structural element of the frame, as a vertical coupling element and to design the link element of the three-bar-chain, which is connected to the axle, as an approximately horizontal coupling element.

Referring now to the drawing in detail, the rear portion of the vehicle shown therein has a driving axle 1. The driving axle 1 is on both sides connected by block-shaped rubber springs 2 or other spring elements to the longitudinal side walls 3 of a vehicle frame 4. The longitudinal side walls 3 are at the rear end of the vehicle connected to each other directly by an upper transverse yoke 5 and indirectly through a lower transverse yoke 6 which is supported by vertical pull struts 7 of the vehicle frame 4. The central portion of the transverse yoke 5 is by two vertical links 8 connected to the transverse yoke 6. The two links 8 are arranged in spaced relationship to each other and are provided with connecting bores 9 for a bolt 13 for connection with the connecting member 10 of an upper link 11 pertaining to a three-point implement connecting device 12. The device 12 in addition to being provided with an upper link 11 also has two lower links 14 which by means of their connecting elements 15 located at the vehicle side and designed as ball joint are through a three-bar-chain 16 of the invention connected to the driving axle 1 and to the transverse yoke 6. The two chains 16 according to the invention are formed by a horizontal link 17 each and by an approximately vertical link 18 each. The horizontal links 17 are by means of a bolt 19 connected to a support 20, 21 of the driving axle 1. The horizontal links 17 and the vertical links 18 are connected to each other by means of a bolt 22 which at the same time also connects the connecting members 15 on the vehicle side of the lower links 14 with the latter. On the frame side, the vertical links 18 are linked to a supporting block 23, 24 respectively of the transverse yoke 6 by means of a bolt 25.

The lifting and lowering of the implement connecting device 12 is effected by one double acting lifting cylinder 26 associated with the respective lower link 14. The lifting cylinders 26 are on the side of the link by means of a bolt 27 connected with the lower links 14 and on the frame side are by means of a bolt 28 connected to a bearing block 29 of the upper transverse yoke 5.

The operation of the three-bar-chain is, in case the spring of the vehicle frame 4 changes relative to the driving axle 1 as follows:

When the vehicle frame 4 springs or deflects relative to the driving axle 1 by means of the springs 2 as illustrated at the left and right in the drawing, it will be appreciated that due to the indirect coupling of the connecting members 15 arranged on the vehicle side and pertaining to the lower links 14 with the links 8, the connecting point 10 arranged on the vehicle side and pertaining to the upper link 11 is displaced vertically to the same extent. Due to the spring of the connecting members 10, 15 of the four-bar-chain, which spring is proportional to the displacement of the connecting point 10 of the upper link 11, a pivot movement in the same direction of all links relative to the vehicle will occur so that the ideal linkage point of the implement connecting device 12 will move only on the predetermined path so that the influence of the spring of the vehicle upon the implement connecting device will be eliminated. It may be mentioned that instead of the embodiment illustrated in the drawing for solving the problem underlying the present invention, the connecting members 15 on the vehcile side may directly, for instance through a triangular frame, by means of the connecting member 10 of the upper link 11 be directly connected to each other. Also there exists the possibility within the teaching of the present invention to undertake the suspension or springing of the driving axle according to FIGS. 1 and 2 of U.S. Pat. No. 2,692,778 — Stump issued Oct. 26, 1954.

It is, of course, to be understood that the present invention is, by no means, limited to the specific showing in the drawing but also comprises any modifications within the scope of the appended claims.

What is claimed is:

1. In a hitch device for hitching an implement to a draft vehicle which has an axle and a frame spring mounted on the axle; said hitch device comprising; a generally horizontal upper link having one end pivoted to the vehicle frame, and the other end adapted for a pivotal connection to the implement, laterally spaced generally horizontal lower links each having one end adapted for pivotal connection to the implement, generally horizontal connecting links each having one end pivoted to the vehicle axle and the other end pivoted to the other end of a respective said lower link, lift means pivotally connected at the lower end to each said lower link between the ends thereof and extending upwardly therefrom and adapted for pivotal connection at the upper end to the vehicle frame, and further means connected between the vehicle frame and said connecting links and transmitting vertical movement of said frame on said axle to the pivotal interconnection of said lower links with said connecting links.

2. A hitch device according to claim 1 in which said further means comprises a pair of generally vertical further links each having the lower end pivotally connected to one of a respective connecting link and the pertaining lower link near the pivotal interconnection thereof and the upper end adapted for pivotal connection to the vehicle frame.

3. A hitch device according to claim 1 in which each connecting link and said further means forms a three bar linkage which includes said connecting link, a second link of each linkage having one end fixed to the vehicle frame, the third link of each linkage having the ends pivotally connected to the other ends of said connecting link and said second link.

4. A hitch device according to claim 3 in which the point of pivotal interconnection of said third link with said connecting link coincides with the pivotal connection of said connecting link with the pertaining lower link.

5. A hitch device according to claim 3 in which the said third link of each three bar linkage is substantially vertical while the said connecting link of each three bar linkage is substantially horizontal.

6. In combination; a draft vehicle having an axle and a frame resiliently supported on the axle, and a hitch device for connecting an implement to said vehicle, said hitch device including a generally horizontal upper link pivoted at one end to the frame and at the other end adapted pivotally to engage an implement, a pair of generally horizontal laterally spaced lower links adapted at one end for pivotal connection to the implement and having the other ends near said axle, a pair of expansible and contractable lift means each connected at the lower end to a respective lower link between the ends thereof and extending upwardly therefrom and pivoted at the upper end to said frame, and a pair of linkage means each connecting the said other end of a respective lower link to said axle and frame, each said linkage means comprising a first horizontal link having one end pivoted to the axle and the other end pivoted to the said other end of the respective lower link, each linkage also comprising a second vertical link pivoted at the lower end to said other ends of a respective first link and the pertaining lower link, and each linkage comprising a third link fixed at one end to said frame and at the other end to the upper end of the respective second link.

* * * * *